E. C. QUANDER.
POULTRY DRINKING FOUNTAIN.
APPLICATION FILED FEB. 17, 1916.
1,183,667.
Patented May 16, 1916.
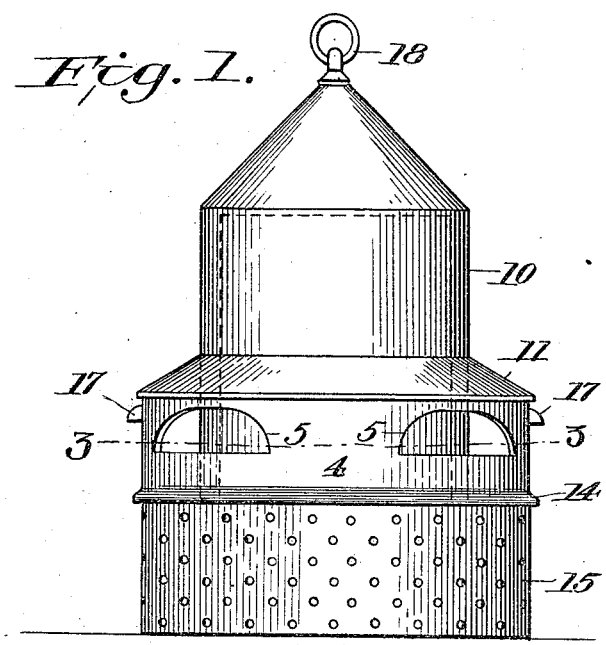
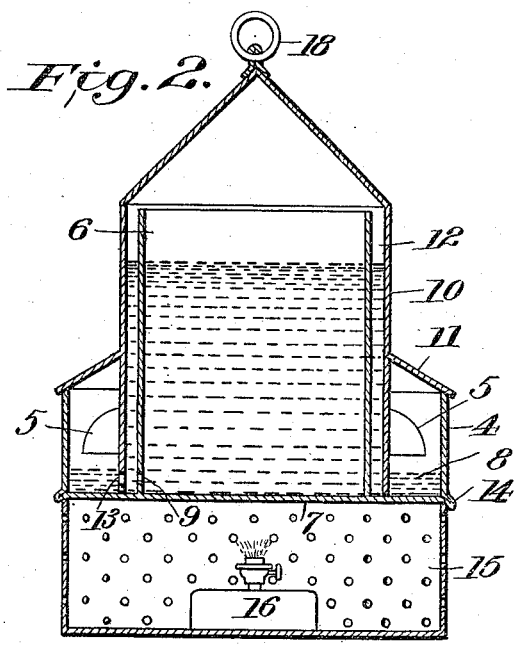
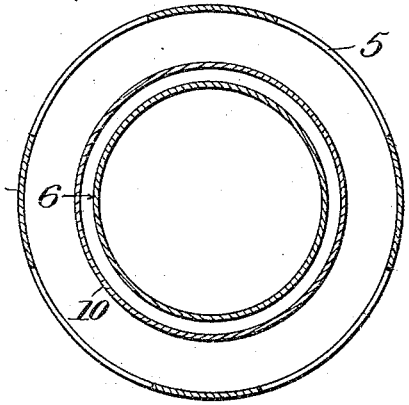
Inventor
Emil C. Quander
By
Attorney

UNITED STATES PATENT OFFICE.

EMIL C. QUANDER, OF BROOKLYN, NEW YORK.

POULTRY DRINKING-FOUNTAIN.

1,183,667.　　　　Specification of Letters Patent.　　Patented May 16, 1916.

Application filed February 17, 1916. Serial No. 78,950.

*To all whom it may concern:*

Be it known that I, EMIL C. QUANDER, a citizen of the United States, residing at Brooklyn, in the county of Kings and State of New York, have invented certain new and useful Improvements in Poultry Drinking-Fountains, of which the following is a specification.

This invention relates to poultry drinking fountains.

One object is to provide a poultry drinking fountain embodying among other characteristics structural features whereby the fountain may be supplied with water and maintained at a uniform level easily and readily accessible to the fowls without the possibility of fowls bathing in the water, or upsetting the same or in any way causing the water to become contaminated by the fowls.

Another object resides in the provision of a poultry drinking fountain constructed of such parts and in such manner that the same may be easily and readily set up for use and effectually perform the functions for which it is intended and which may be effectually used in either warm or cold weather, there being a suitable heating means which may or may not be associated with the fountain but which is preferably used in cold weather to prevent freezing of the water in the fountain or to maintain the same at a uniform temperature.

With the above and other objects in view, the present invention consists in the combination and arrangement of parts hereinafter more fully described, illustrated in the accompanying drawings, and particularly pointed out in the appended claims, it being understood that changes may be made in the form, size, proportion and minor details without departing from the spirit or sacrificing any of the advantages of the invention.

In the drawings: Figure 1 is an elevation of the invention. Fig. 2 is a vertical sectional view. Fig. 3 is a horizontal sectional view on the line 3—3 of Fig. 1.

Referring now more particularly to the accompanying drawings, the reference character 4 indicates a water tank provided with openings 5 in its side walls and having a water reservoir 6 rising from its bottom 7 in spaced relation to the side walls of the reservoir to form a trough 8 with which the reservoir communicates by way of one or more relatively small apertures 9.

The openings 5 are provided to permit the fowls to drink of the water in the trough without splashing the water or contaminating the same with dirt or other foreign matter.

A bell 10 provided with a flange 11 intermediate its ends is supported in the trough 8 in spaced relation to the water reservoir and the walls of the tank or trough to form a water seal 12. As shown, the bell 10 has its flange 11 resting on the upper edge of the wall of the tank or trough so as to support the bell and to prevent access to the tank or trough through the top of the latter. The bell has an aperture 13, which is relatively small, adjacent its lower end to permit the water in the space between the reservoir 6 and the walls of the bell to flow into the trough 8, wherein it is maintained at a uniform level in the trough.

At the juncture between the bottom and side walls of the tank there is preferably formed a flanged bead 14 designed to embrace the upper edge of a perforated or other heating chamber 15, in which latter a lamp 16 may be disposed to heat the water for the purpose of preventing freezing in cold weather or to maintain a proper temperature of the water.

For convenience the tank may be provided with handles 17 and, if desired, the bell 10 may have a handle or the like 18.

From the foregoing it will be apparent that, whether or not the heating chamber and heating means are employed, the reservoir 6 may be easily and readily filled with water without danger of the trough overflowing because of the relatively small opening 9 adjacent the bottom of the reservoir and that as soon as the reservoir has been supplied with water, the bell 10 may be readily positioned with its flange 11 taking the upper edge of the wall of the tank and effecting a seal to prevent overflow of the water from the trough out through the openings 5 and effectually providing a seal to maintain a normal level of the water in the trough 8.

What is claimed is:

1. A poultry fountain comprising a water tank open at its top and provided with openings in its sides, a water reservoir rising from the bottom of the tank in spaced relation to the side walls of the tank to form a trough, said reservoir having a relatively small aperture adjacent its lower end leading into the trough, and a bell member embracing the reservoir in spaced relation thereto and spaced from the walls of the tank and provided with a flange intermediate its ends which rests upon the upper edge of the side walls of the tank to cover the trough, the bell having an aperture to establish communication between the reservoir and the trough.

2. A poultry fountain comprising a water tank open at its top and provided with openings in its sides, a water reservoir rising from the bottom of the tank in spaced relation to the side walls of the tank to form a trough, said reservoir having a relatively small aperture adjacent its lower end leading into the trough, a bell member embracing the reservoir in spaced relation thereto and spaced from the walls of the tank and provided with a flange intermediate its ends which rests upon the upper edge of the side walls of the tank to cover the trough, the bell having an aperture to establish communication between the reservoir and the trough, the tank having a flange on its bottom, a chamber whose upper edge fits within said last named flange, and a heating means disposed within said chamber.

3. A poultry fountain comprising a water tank open at its top and provided with openings in its sides, a water reservoir rising from the bottom of the tank centrally thereof in spaced relation to the side walls of the tank to form an annular trough, said reservoir having a relatively small aperture therein, a bell embracing the reservoir in spaced relation thereto and spaced from the walls of the tank and provided with a flange which rests upon the upper edge of the side walls of the tank to cover the trough, the bell having an aperture to establish communication between the reservoir and the trough, and a heating means for heating the water.

In testimony whereof I affix my signature in the presence of two witnesses.

EMIL C. QUANDER.

Witnesses:
 GROVER C. HILL,
 CONSTANCE QUANDER.

Copies of this patent may be obtained for five cents each, by addressing the "Commissioner of Patents, Washington, D. C."